Patented Oct. 14, 1952

2,614,060

UNITED STATES PATENT OFFICE 2,614,060

GERMICIDAL COMPOSITIONS

David F. Rogers, Webster Groves, Mo., assignor to Monsanto Chemical Company, St. Louis, Mo., a corporation of Delaware No Drawing. Application August 9, 1948, Serial No. 43,350

6 Claims. (Cl. 167—14)

This invention relates to new compositions possessing increased germicidal properties and comprising an alkali metal tripolyphosphate and varying proportions of a compound selected from the group consisting of benzyl-o-chlorophenol and the water soluble salts of benzyl-o-chlorophenol; more particularly, this invention relates to novel compositions of increased germicidal properties by reason of having incorporated therein a mixture consisting of an alkali metal tripolyphosphate and varying proportions of a compound selected from the group consisting of benzyl-ortho-chlorophenol and its water soluble salts.

Many water soluble phenolates are known to possess some degree of germicidal properties and therefore have been formulated into dispersions, solutions, emulsions and powders for use in germicidal applications. These phenolates have a tendency to hydrolyze in aqueous solutions or emulsions thereby liberating free phenol which at times decreases the effectiveness of the germicidal composition. In order to prevent this hydrolysis, it has been a practice to add an excess of free alkali to the germicidal formulation. While this procedure did facilitate the preparation of more stable compositions, the utility of these compositions was then limited to those applications where the free alkali could be tolerated without deleterious results.

Heretofore, the disadvantages occurring from the use of excess free alkali in such formulations have been counteracted to a certain extent by replacing the excess of free alkali with the alkali metal salts of orthophosphoric, metaphosphoric, and pyrophosphoric acids. This procedure not only produced more stable compositions, but also at times very slightly enhanced the bactericidal properties of the formulations.

There are many phenolates and phenols which show some germicidal activity against Eberthella typhosa. A number of these materials, while in a sense being destructive to this microorganism, exhibit relatively low toxicity necessitating the use of high concentrations of the active ingredient in the germicidal compostion in order that the formulation be of practical utility. It is desirable from an economical viewpoint to obtain an active germicidal material with as high a phenol coefficient against E. typhosa as possible so that in the preparation of germicidal and antiseptic formulations, only a small proportion of the active ingredient is necessary.

Benzyl-o-chlorophenol and its water soluble salts are examples of germicides which exhibit relatively low effectiveness against E. typhosa.

It is an object of this invention to provide improved germicidal compositions containing benzyl-o-chlorophenol or its water soluble salts and possessing greatly enhanced germicidal properties.

It is a further object of this invention to provide an improved germicidal composition possessing a relatively high phenol coefficient against E. typhosa.

It is also an object of this invention to provide an improved germicidal composition possessing a high phenol coefficient against E. typhosa which may be formulated into stable solutions, emulsions, dispersions, or powders.

Further objects will become apparent from the following description and examples.

The objects of this invention are accomplished by providing a germicidal composition comprising an alkali metal tripolyphosphate and a compound selected from the group consisting of benzyl-o-chlorophenol and its water soluble salts.

Alkali metal tripolyphosphates per se have negligible germicidal activity. For example, aqueous solutions of sodium tripolyphosphate had phenol coefficients against E. typhosa of less than one. It has been found however, that a mixture of benzyl-o-chlorophenol or its water soluble salts and an alkali metal tripolyphosphate may be formulated into a practical formulation having a germicidal activity approximately 10 times greater than that that could be obtained using either of the individual materials alone.

While the alkali metal tripolyphosphates are compatible with benzyl-o-chlorophenol and its water soluble salts in all proportions, the preferred practical composition is a mixture which contains an alkali metal tripolyphosphate and from substantially 5% to substantially 70% by weight, based on the alkali metal tripolyphosphate, of the aforementioned phenol or phenolate. Any of the alkali metal tripolyphosphates are suitable for use in these germicidal compositions; however, for practical and economical reasons, the sodium tripolyphosphate is preferred. Similarly, while any water soluble benzyl-o-chlorophenolate is suitable for the novel compositions of this invention, the sodium benzyl-o-chlorophenolate is preferred.

The compositions of this invention may be combined with other materials and ingredients to formulate solutions, dispersions, emulsions and powders having enhanced germicidal properties. For example, free-flowing detergent powders having valuable germicidal properties may be prepared by incorporating the novel compositions of this invention in varying proportions with solid detergents. Any so prepared formulation may also have present, as dictated by the application, use, or necessity, various liquid or solid soaps, detergents, wetting agents, solvents, etc. without materially affecting the germicidal properties of the formulation.

In carrying out this work, the phenol coefficients as reported in the subsequent examples were determined by the method developed by the United States Public Health Service, Hygienic Laboratories, and set forth in Circular 198 of the Food and Drug Administration, United States Department of Agriculture. All values were based on a phenol coefficient of 1.0 for pure phenol against *E. typhosa*.

The following examples are illustrative of the manner in which the novel composition of this invention may be prepared but it is not intended that the invention be limited solely to the variations and proportions set forth.

EXAMPLE I

Various aqueous germicidal solutions were prepared containing benzyl-o-chlorophenol plus slightly in excess of a molecular equivalent of sodium hydroxide in order to form the soluble sodium benzyl-o-chlorophenolate. To these solutions was added varying quantities of sodium tripolyphosphate. The phenol coefficients of these various germicidal formulations were then determined. The outstanding synergistic effect of mixtures of sodium tripolyphosphate and sodium benzyl-o-chlorophenolate is evident from the phenol coefficients set forth in Table A. All parts are by weight unless otherwise noted.

*Table A*

| Composition | Phenol coefficient at 20° C. Against *E. typhosa* |
|---|---|
| 1 part benzyl-o-chlorophenol plus 1.1 molecular equivalents of NaOH | 18 |
| With 0.1 part sodium tripolyphosphate | 35 |
| With 0.5 part sodium tripolyphosphate | 92 |
| With 1.0 part sodium tripolyphosphate | 133 |
| With 3.0 parts sodium tripolyphosphate | 215 |
| With 5.0 parts sodium tripolyphosphate | 210 |

In a similar manner an aqueous germicidal formulation was prepared containing the water soluble sodium benzyl-o-chlorophenolate with 3.0 parts of tetrasodium pyrophosphate. The resulting solution had a phenol coefficient of 105 as compared to the phenol coefficient of 215 of a similar solution containing sodium tripolyphosphate in place of the tetrasodium pyrophosphate which is indicative of the outstanding superiority of the use of the sodium tripolyphosphate over other types of phosphates in such formulations.

While in the above formulation the sodium salt of benzyl-o-chlorophenol was formed in solutions, the sodium benzyl-o-chlorophenolate may be prepared separately and then dissolved in water with similar results. Other water soluble salts of benzyl-o-chlorophenol such as the potassium, lithium, ammonium, magnesium, etc., gave similar results. In place of the sodium tripolyphosphate, it has been found that potassium tripolyphosphate or mixtures of sodium and potassium tripolyphosphate may be utilized with the same outstanding results.

EXAMPLE II

Various aqueous germicidal formulations were prepared containing benzyl-o-chlorophenol, soaps, alcohols and alkali as solubilizing agents, and varying quantities of sodium tripolyphosphate. The phenol coefficients of such formulations are set forth in Table B, wherein all quantities expressed are parts by weight unless otherwise noted.

*Table B*

| Benzyl-o-chlorophenol | Cocoanut Oil Soap | Isopropanol | Sodium Tripolyphosphate | Molecular equivalents of NaOH | Phenol Coefficient against *E. typhosa* at 20° C. |
|---|---|---|---|---|---|
| Parts | Parts | Parts | Parts | | |
| 1 | 3 | 2 | 0 | 0 | 14.5 |
| 1 | 3 | 2 | 0 | 1.1 | 33 |
| 1 | 3 | 2 | 3 | 0 | 204 |
| 1 | 3 | 2 | 3 | 1.1 | 176 |

These results show the outstanding utility of sodium tripolyphosphate in enhancing the germicidal activity of liquid formulations containing benzyl-o-chlorophenol. In such formulations as shown in Table B, the quantities of the soap and alcohol present may be considerably varied to produce solutions exhibiting a variety of properties. The cocoanut oil soap may be replaced with other soaps such as castor oil, linseed oil, soybean oil and rosin soaps and various synthetic detergents. Isopropanol may also be replaced with other alcohols which are soluble in water and enhance the solubility of the benzyl-o-chlorophenol. Table B further shows that such solutions may or may not contain excess free alkali with the same advantageous results.

EXAMPLE III

An exceedingly useful and practical free flowing powdered detergent composition exhibiting outstanding germicidal characteristics was prepared by mixing 10 parts of benzyl-o-chlorophenol with 85 parts of sodium tripolyphosphate and subsequently with 5 parts of sodium dodecyl benzene sulfonate. This material when prepared had a phenol coefficient against *E. typhosa* at 20° C. of 194. Twelve months later this same composition had a phenol coefficient of 233, indicating outstanding germicidal stability.

Similar compositions were prepared, varying the quantities of detergent and active germicidal toxicant so that formulations of varying detergency properties and varying germicidal properties resulted. In place of the sodium dodecyl benzene sulfonate may be substituted any of the solid detergents, whether they be the ordinary alkali metal soaps such as the sodium soaps or synthetic inorganic or organic detergents. Typical of such detergents are the water soluble salts of organic substituted, poly-basic, oxygen-containing, inorganic acids, including sulfates and sulfonates, alkyl sulfates, alkyl aryl sulfonates, "keryl" benzene sulfonates, alkyl sulfosuccinates, borates and sulfoborates. The quantity of the active germicidal toxicant and sodium tripolyphosphate in such formulations is varied with respect to the solid detergent according to the desired germicidal and detergent properties.

What is claimed is:

1. A germicidal composition comprising an alkali metal tripolyphosphate and from substantially 5% to substantially 70% by weight, based on the alkali metal tripolyphosphate, of a compound selected from the group consisting of benzyl-o-chlorophenol and its water soluble salts.

2. A germicidal composition comprising sodium tripolyphosphate and from substantially 5% to substantially 70% by weight, based on the sodium tripolyphosphate, of sodium benzyl-o-chlorophenolate.

3. A germicidal composition comprising sodium tripolyphosphate, benzyl-o-chlorophenol and a solid detergent; said benzyl-o-chlorophenol being present in the amount of substantially 5% to substantially 70% by weight of sodium tripolyphosphate.

4. An aqueous germicidal composition comprising an aqueous solution of an alkali metal tripolyphosphate and from substantially 5% to substantially 70% by weight, based on the alkali metal tripolyphosphate, of a compound selected from the group consisting of benzyl-o-chlorophenol and its water soluble salts.

5. An aqueous germicidal composition comprising an aqueous solution of sodium tripolyphosphate and from substantially 5% to substantially 70% by weight, based on the sodium tripolyphosphate, of sodium benzyl-o-chlorophenolate.

6. A germicidal composition comprising sodium tripolyphosphate, benzyl-o-chlorophenol and a liquid detergent; said benzyl-o-chlorophenol being present in the amount of substantially 5% to substantially 70% by weight of sodium tripolyphosphate.

DAVID F. ROGERS.

REFERENCES CITED

The following references are of record in the file of this patent:

UNITED STATES PATENTS

| Number | Name | Date |
|---|---|---|
| 1,880,566 | Weiler et al. | Oct. 4, 1932 |
| 2,138,805 | Halvorson et al. | Nov. 29, 1938 |
| 2,326,933 | Endres | Aug. 17, 1943 |
| 2,359,240 | Partansky | Sept. 26, 1944 |
| 2,360,269 | Partansky | Oct. 10, 1944 |

FOREIGN PATENTS

| Number | Country | Date |
|---|---|---|
| 174,211 | Switzerland | Mar. 16, 1935 |